Patented May 6, 1952

2,595,676

UNITED STATES PATENT OFFICE 2,595,676

MANUFACTURE OF PAINTS AND VARNISH

Morris Kaufman and Alan Fowler Williams, London, England, assignors to C. D. Patents Limited, London, England, a British company No Drawing. Application October 14, 1949, Serial No. 121,463. In Great Britain October 19, 1948

8 Claims. (Cl. 106—265)

The present invention is for improvements in or relating to the manufacture of paints and varnishes, and is concerned more specifically with improving the heat-resistant properties of organic paints and varnishes compounded from styrene or from unsaturated monomers of the styrene type.

It is known that styrene copolymerizes with drying oils and semi-drying oils, such as linseed oil and dehydrated castor oil, to give surface coatings with valuable properties such as rapid drying, good covering power, and satisfactory brushing. Such coatings, however, have the disadvantage that their heat-resistance is relatively low.

We have found that a coating of improved heat-resistance is obtained if a proportion of acenaphthylene is incorporated in the styrene drying or semi-drying oil mixture before polymerization.

According to this invention, a process for the manufacture of an organic paint or varnish having good heat-resisting properties comprises the copolymerization of acenaphthylene, styrene and a drying or semi-drying oil under heat and in the presence of a solvent which is a common solvent for acenaphthylene and styrene and which is miscible with the drying or semi-drying oil. If desired, there may be added a small proportion of one or more of the drying agents in general use for styrene-compounded paints or varnishes.

There may be incorporated in the compositions pigments commonly employed in the paint industry, for example zinc oxide, prussian blue or titanium dioxide, or oil soluble dyes.

The preferred solvent for use in this invention is a terpene, such for example as turpentine, α-pinene, and diphentene.

The following is a description by way of example of two processes embodying the present invention. All the parts are parts by weight.

Example I 10 parts of styrene, 2 parts of linseed oil, and 1 part of acenaphthylene were dissolved in 30 parts of turpentine. The solution was refluxed for 12 hours to yield a clear, light brown, homogeneous solution. To this solution was added 20 parts of turpentine containing ¼ part of drying agent (consisting of 3 parts of lead naphthenate and 1 part cobalt naphthenate). After cooling, the solution was ready for application as a varnish.

Example II

In making a white paint 10 parts of styrene, 2 parts of linseed oil and 1 part of acenaphthylene were dissolved in 30 parts of turpentine. The solution was refluxed for 12 hours. To the solution were added 7½ parts of titanium dioxide, ¼ part of drying agent (consisting of 3 parts of lead naphthenate and 1 part of cobalt naphthenate) in an amount of turpentine necessary to give the required consistency.

In the appended claims the expression "drying oil" is used to include both drying oils strictly so-called and the semi-drying oils commonly used in paints and varnishes.

We claim:

1. A process for the manufacture of an organic paint or varnish having good heat-resisting properties which process comprises the copolymerisation of, by weight, one part of acenaphthylene, 10 parts of styrene and 2 parts of a drying oil by the action of heat in the presence of a terpene.

2. A process for the manufacture of an organic paint or varnish having good heat-resisting properties which process comprises the co-polymerisation of styrene with from 5% to 20% of its weight of acenaphthylene, and from 20% to 30% of its weight of a drying oil by the action of heat in the presence of a solvent which is a common solvent for acenaphthylene and styrene and is miscible with the drying oil the amount of such solvent being that necessary to render the mixture of a desired consistency for use as a paint or varnish.

3. A process for the manufacture of an organic paint or varnish having good heat-resisting properties as claimed in claim 2 wherein the common solvent is a terpene.

4. A process for the manufacture of an organic paint or varnish having good heat-resisting properties as claimed in claim 2 wherein the common solvent is turpentine.

5. A process for the manufacture of an organic paint or varnish as claimed in claim 2 in which a colouring pigment is incorporated in the mixture.

6. A process for the manufacture of an organic paint or varnish having good heat-resisting properties as claimed in claim 2 wherein from 2% to 5% of a drying agent is added to the mixture before co-polymerisation.

7. A process for the manufacture of an organic paint or varnish having good heat-resisting properties as claimed in claim 6 wherein the drying agent is a metallic naphthenate.

8. A process for the manufacture of an organic paint or varnish having good heat-resisting properties as claimed in claim 6 wherein the drying agent is a compound selected from the group consisting of lead naphthenate and cobalt naphthenate.

MORRIS KAUFMAN.
ALAN FOWLER WILLIAMS.

REFERENCES CITED

The following references are of record in the file of this patent:

UNITED STATES PATENTS

| Number | Name | Date |
|---|---|---|
| 2,157,768 | Long | May 9, 1939 |
| 2,338,128 | Minich | Jan. 4, 1944 |
| 2,443,044 | Lycan et al. | June 8, 1948 |
| 2,445,181 | Miller et al. | July 13, 1948 |